(12) United States Patent
Stehle

(10) Patent No.: US 8,063,726 B2
(45) Date of Patent: Nov. 22, 2011

(54) ELECTROMAGNETIC ACTUATING DEVICE

(75) Inventor: Roland Stehle, Stockach (DE)

(73) Assignee: ETO Magnetic GmbH, Stockach (DE)

( * ) Notice: Subject to any disclaimer, the term of this patent is extended or adjusted under 35 U.S.C. 154(b) by 217 days.

(21) Appl. No.: 11/751,053

(22) Filed: May 21, 2007

(65) Prior Publication Data
US 2007/0273462 A1 Nov. 29, 2007

(30) Foreign Application Priority Data
May 24, 2006 (DE) .......................... 10 2006 024 841

(51) Int. Cl.
*H01F 3/00* (2006.01)
*H01F 7/08* (2006.01)
*F16K 31/06* (2006.01)

(52) U.S. Cl. .................................. 335/279; 251/129.21

(58) Field of Classification Search .................. 335/279; 251/129.21
See application file for complete search history.

(56) References Cited

U.S. PATENT DOCUMENTS
4,653,525 A * 3/1987 Young ........................... 137/238
7,219,695 B2 * 5/2007 Pechtold .................. 137/625.33

FOREIGN PATENT DOCUMENTS
DE 202005013233 U1 10/2005
DE 102006011755 A1 9/2007
* cited by examiner

*Primary Examiner* — Ramon Barrera
(74) *Attorney, Agent, or Firm* — Bachman & LaPointe, P.C.

(57) ABSTRACT

An electromagnetic actuating device comprising an armature unit which can be moved along a longitudinal axis relative to a stationary core by passing a current through a coil device, said armature unit being designed to form or define a fluid flow channel, wherein the armature unit has at one end an axially elongate cylindrical section, to which an annular groove-shaped section of reduced outer diameter is connected in the direction of the longitudinal axis, wherein the fluid flow channel extends into the annular groove-shaped section, wherein the fluid flow channel runs through the elongate cylindrical section in the manner of a through-channel, in particular a through-bore, running obliquely with respect to the longitudinal axis, so that a first opening at the end side and/or an opposite second opening of the through-channel are provided outside the cylindrical outer wall of the elongate section.

7 Claims, 2 Drawing Sheets

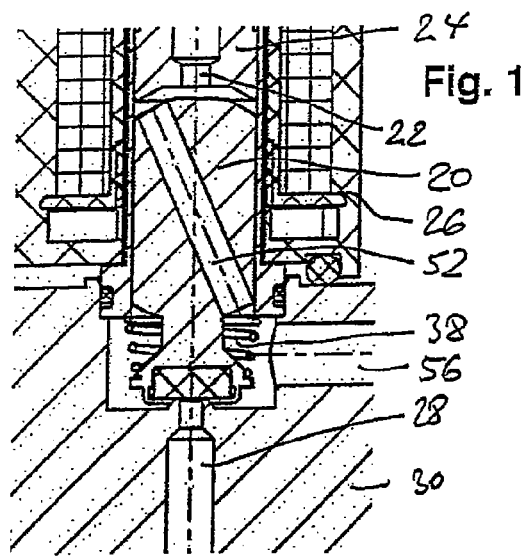
Fig. 1
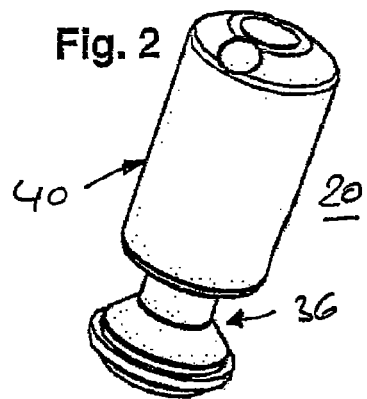
Fig. 2
Fig. 5
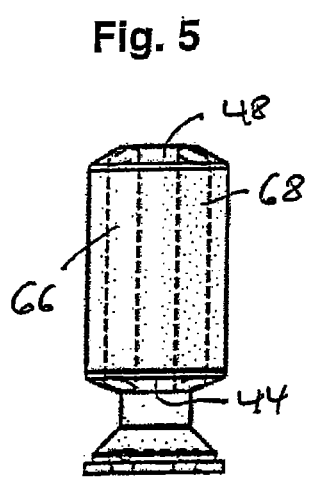
Fig. 6
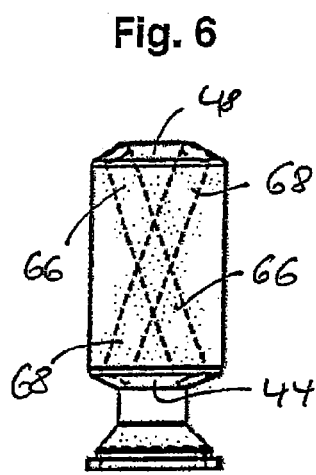
Fig. 3
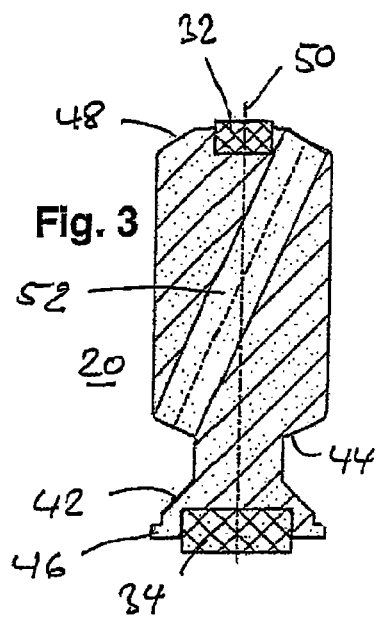
Fig. 7
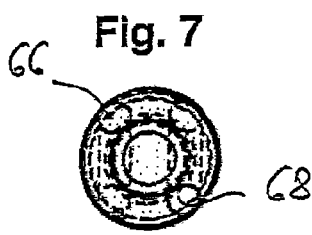
Fig. 4
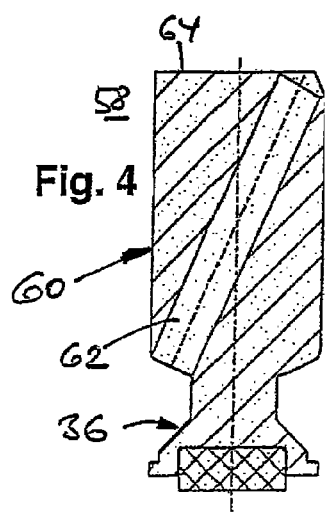

ELECTROMAGNETIC ACTUATING DEVICE

BACKGROUND OF THE INVENTION

The present invention relates to an electromagnetic actuating device according to the preamble of the main claim. The present invention also relates to an armature unit.

A generic device is known in general from the prior art and is described for example in connection with DE 20 2005 012 297 by the Applicant, and especially in connection with FIGS. 6 and 7 therein. More specifically, in such generic devices, an armature unit is moved in a manner otherwise known per se by passing a current through a coil surrounding it in order to control a fluid flow by means of the movement of the armature unit. Typical uses include for example hydraulic or pneumatic valves, and these are in turn typically used in the vehicle industry.

FIG. 8 (cross-sectional view of a known armature unit) and FIG. 9 (perspective view of the armature unit shown in FIG. 8) illustrate such an armature unit which is presumed to be known. An armature body 10 made of a suitable magnetic material has in the circumferential region two elongate ventilation grooves 12 which serve for the described fluid flow. For sealing purposes and for weight reasons, the interior of the described armature unit is moreover filled with a respective vulcanized elastomer (14) which forms wide sealing regions 16 and 18 in respective end regions of the armature body 10. When this illustrated armature unit is used as intended within an electromagnetic actuating device, a fluid flow would then take place through the channels 12 in a manner suitably influenced by moving the armature unit.

However, such a device is disadvantageous for various reasons, in particular with regard to easy and automated manufacture (which is important from the mass production point of view). For example, in the device deemed to be generic, (fully) automated production of the complete armature is difficult to achieve since the illustrated technology requires smooth grinding. Furthermore, the manufacture of the illustrated arrangement with the known fluid guiding channels (ventilation grooves) 12 leads to the formation of burrs, which in turn mean that complex post-machining is required.

The illustrated grooves also have magnetic disadvantages (magnetic losses and thus potentially a reduction in the achievable magnetic force occur on account of the interruption or widening of the air gap in the circumferential direction that is brought about thereby). The illustrated groove contour is susceptible to wear during long-term use and (in a manner mechanically associated with this disadvantage) generates disadvantageous friction when moving in the stationary core unit.

Finally, the illustrated groove geometry which is presumed to be generic for forming the fluid flow channels gives rise to a disadvantageous tilting of the armature relative to the surrounding guide, so that there is also the potential for optimization here.

The object of the present invention is therefore to improve an electromagnetic actuating device according to the preamble of the main claim with regard to its manufacturing properties, magnetic and mechanical properties, in particular to optimize the potential for automated manufacture, to increase the achievable magnetic force, and in the process to reduce friction and wear on the armature.

SUMMARY OF THE INVENTION

This object is achieved by providing an electromagnetic actuating device comprising an armature unit which can be moved along a longitudinal axis relative to a stationary core by passing a current through a coil device, said armature unit being designed to form or define a fluid flow channel, wherein the armature unit has at one end an axially elongate cylindrical section, to which an annular groove-shaped section of reduced outer diameter is connected in the direction of the longitudinal axis, wherein the fluid flow channel extends into the annular groove-shaped section, characterized in that the fluid flow channel runs through the elongate cylindrical section in the manner of a through-channel, in particular a through-bore, running obliquely with respect to the longitudinal axis, so that a first opening at the end side and/or an opposite second opening of the through-channel are provided outside the cylindrical outer wall of the elongate section.

In an advantageous manner according to the invention, the longitudinal groove-shaped fluid guiding channel formed (as a single channel or in pairs) in the mantle region of the elongate section of the armature is replaced by a channel structure designed as a through-channel, preferably as a through-bore, which runs obliquely or in an inclined manner with respect to the longitudinal axis in the elongate section of the armature, wherein according to the invention at least one, preferably the respective openings of this through-channel are formed outside the cylindrical wall of the elongate section, in other words open out in such a way that they do not disadvantageously form a tangent to the outer mantle which is important for the air gap (and thus the magnetic force generation), and furthermore produce less friction and accordingly less wear since the edges of the opening are offset inwards. Furthermore, disadvantageous tilting of the armature which was brought about by the known outer slots is no longer possible on account of the fact that the full outer surface of the cylinder is retained unimpaired.

A further advantage of the invention which is important with regard to manufacture lies in the fact that, when the through-channel according to the invention is preferably designed as a through-bore, this can easily be deburred at both sides, not least because it allows easy and unhindered access by a tool from both sides, in particular including in the region of the annular groove-shaped section of the armature, due to the fact that it is inclined at an angle to the longitudinal axis through the armature.

The provision of a bore (or as claimed in one further development a plurality of bores which are not connected to one another) in the armature body made from solid metal material therefore means that an optimized armature unit can be produced with favorable mechanical, magnetic and manufacturing properties.

According to one further development, it has been found to be particularly preferable to provide respective cone-shaped, suitably inclined surface sections at least in the region of one opening of the through-channel (preferably: through-bore), but preferably on both sides, so that a center line through a respective (preferably circular) opening lies radially in the surface of such a cone-shaped section and runs perpendicular to the longitudinal axis of the through-channel (through-bore). In the axial sectional view through the armature unit, this then leads to a surface geometry in which the longitudinal axis through the through-channel is typically inclined by an angle of 150 to 300 with respect to the longitudinal axis of the armature unit, the respective openings of the through-channel, preferably at right angles to the longitudinal axis thereof, then form angles of 75° to 60° with respect to the longitudinal axis of the armature unit and, more preferably, the planes through the two openings of the through-channel run parallel to one another.

In order to optimize the magnetic structure, according to one further development these cone-shaped surfaces (on the one hand the cone-shaped surface located in the end region and on the other hand the cone-shaped surface which forms a wall of the elongate cylindrical section and also a wall of the annular groove-shaped section) are in each case configured radially in such a way that the radial dimension approximately matches the opening or bore diameter.

The present invention is not restricted to the provision of one inclined through-channel, but rather it is also within the scope of the invention to provide two or more through-channels (preferably: through-bores) which are skewed with respect to one another and are preferably distributed over the circumference. Advantageously, they are separate from one another in flow terms and are skewed with respect to one another.

BRIEF DESCRIPTION OF THE DRAWINGS

Further advantages, features and details of the invention will emerge from the following description of preferred examples of embodiments and with reference to the drawings, in which:

FIG. 1: shows a schematic side sectional view of the electromagnetic actuating device according to a first preferred embodiment for forming a pneumatic valve;

FIG. 2: shows a perspective view of the armature unit according to the arrangement in FIG. 1;

FIG. 3: shows a longitudinal section through the armature unit shown in FIG. 2;

FIG. 4: shows a longitudinal section similar to the diagram in FIG. 3 of a further embodiment of the present invention;

FIG. 5 to FIG. 7: show various views which schematically show the course of a pair of through-channels in an armature unit according to a third embodiment of the invention;

DETAILED DESCRIPTION

Figure 8:
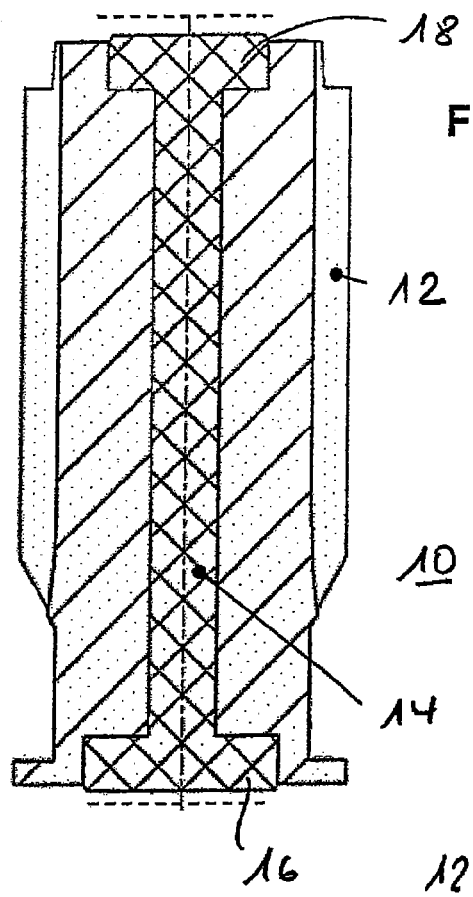
FIG. 8, FIG. 9: show diagrams of an armature unit known from the prior art.
Figure 9:
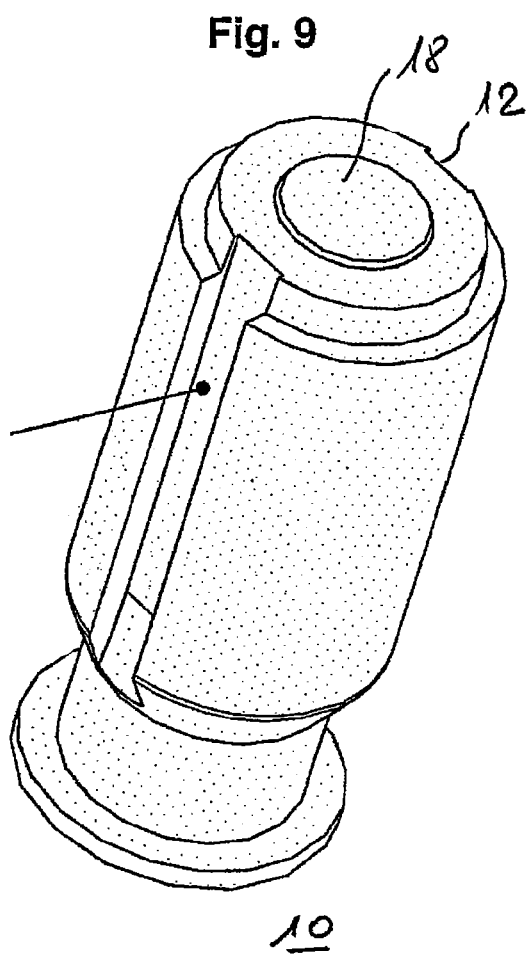

In FIGS. 1 to 3, reference 20 denotes an armature unit which in principle fulfills the same technical purpose as the device from the prior art which was described with reference to FIGS. 8 and 9. More specifically, the sectional view of FIG. 1 illustrates the arrangement of such an armature unit 20 within an electromagnetic actuating device (formed as a pneumatic valve) which has, located axially opposite the armature unit, a core 24 with a central bore 22, a coil unit 26 which surrounds the outside of the armature unit and has one winding, and a yoke section 30 which has a further bore 28. The armature unit 20, which is formed from a solid metal material and has sealing elements 32, 34 made of a rubber material at both end sides, is prestressed against the restoring force of a helical spring 38 acting in an annular groove region 36 of the armature unit 20 in order to close the bore 28.

As can be seen in particular from the diagrams in FIGS. 2 and 3, the armature unit 20 has an elongate cylindrical section 40 which connects to the annular groove section 36 (having conical walls 42, 44 at both sides). In the bottom region of the armature unit, next to the annular groove 36, the body of the armature unit widens again to form a base section 46 which then bears the sealing element 34 in an embedded manner.

In a manner analogous to the wall 44 of the annular groove-shaped section 36 which delimits the cylindrical section 40 and is designed in the manner of a conical annular surface, the end region of the cylindrical section 40 opposite the base section 46 has a cone-shaped annular surface 48 in the end region. As can be seen in particular from the sectional view in FIG. 3, the surfaces 44 and 48 are inclined with respect to one another in cross section in such a way that they form an angle of approx. 60° with respect to the longitudinal axis 50 through the armature unit.

In the illustrated example of embodiment, an oblique through-bore 52 extends from the cone-shaped annular surface 48 to the cone-shaped annular surface 44, which in the illustrated example of embodiment of FIGS. 1 to 3 is configured in such a way that a respective opening width of the bore 52 corresponds to the width of the cone-shaped annular surfaces 48 and 44. In this way, according to the invention it is ensured that the outer mantle surface of the cylindrical region 40 remains unaffected by the bore 52, with the advantageous effect that the armature unit exhibits an improved efficiency (smaller, more uniform air gap) with regard to the electromechanical and movement properties, at the same time the tendency to tilt with respect to the axis 50 is drastically reduced and also the wear can be reduced. At the same time, FIG. 3 in particular shows favorable manufacturing properties: Both the positioning of the top opening of the bore 32 in the region of the surface 48 and the positioning of the bottom (second) opening in the region of the surface 44 in the annular groove allow the easy insertion of deburring tools, so that not only can the bore 52 be produced with a low outlay and in an advantageous manner for mass production, but also the surface finish can be achieved in a simple and fully automated manner.

FIG. 1 shows the mode of operation of the flow channel 52 in the illustrated electromagnetic actuating device according to the example of embodiment: Starting from the illustrated lower stop position (the seal 34 closes the lower bore 28 while the upper seal 32 exposes the upper bore 22, so that a fluid flow can pass from the bore 22 via the fluid flow channel 52 and the annular groove 36 to an inlet or outlet 56), the armature unit 20 is moved into an upper stop position by passing current through the coil device 26. In this position, the upper seal 32 then closes the bore 22, while the lower seal 34 exposes the lower bore 28 so that the fluid flow can pass from the bore 28 to the inlet or outlet 56.

FIG. 4 shows a variant of the first embodiment according to FIGS. 1 to 3. Here, the illustrated armature unit 58 has an elongate cylindrical section 60 which, apart from the upper end region, corresponds to the diagram in FIG. 3 of the first example of embodiment (references with the same design and functionality are thus retained). The only difference is that the example of embodiment shown in FIG. 4 does not have a cone-shaped circumferential surface region in the upper end region, but rather it is designed with a right-angled edge in cross section. Accordingly, in this case, the oblique through-bore as the fluid flow channel 62 opens out in the transition region between the (flat) end surface 64 and the mantle surface of the section 60 (while in the opposite region it still opens out in the region of a conical annular surface of the annular groove section 36), so that although the cylindrical outer wall is slightly impaired at the end side in the upper end region, this is not significantly noticeable in practice compared to the embodiment from the prior art as shown in FIGS. 8, 9 and other geometric and magnetic advantages are obtained as a result of the extended outer cylindrical wall compared to the embodiment in FIGS. 1 to 3, i.e. an outer cylindrical wall that has been made higher in the direction of the upper end side 64.

A further variant (not shown) of this embodiment provides that, like in FIG. 4, the lower opening of the bore 62 still opens out in the region of the annular groove section 62 while the opposite opening is not located in the transition region between the end surface 64 and the mantle surface 60 as in FIG. 4, but rather opens out exclusively at the end surface 64, and therefore once again leaves the mantle surface 60 unaffected and unimpaired. In the further development of the example of embodiment of FIG. 4, this would be achievable if the bore 62 as the fluid flow channel is inclined to a greater extent with respect to the longitudinal:axis.

FIGS. 5 to 7 illustrate according to a further embodiment that, within the context of the present invention, the flow channel is not restricted only to one through-bore but rather, as shown in the various diagrams of FIGS. 5 to 7, may also consist of two through-bores which are in each case inclined with respect to the central axis, and in a first side view shown in FIG. 6 intersect one another in projection but are spaced apart from one another (cf. the view of FIG. 5 which is rotated through 90° with respect to FIG. 6) and run at a distance from one another, so that a respective fluid flow in each channel remains separate. More specifically, the openings of the two illustrated through-bores are arranged on the respective conical annular surfaces 48 and 44 in such a way that they in each case fill an annular width and, in the illustrated skewed manner, are spaced apart from one another in an optimal and geometrically distributed manner. An arrangement of the type shown in FIG. 5 to FIG. 7 (or even the provision of further through-bores which are in each case separate from one another) may be used for example in the case where, for flow technology reasons, a flow volume through the flow channel has to be increased and for example the provision of the single through-bore of FIGS. 1 to 3 is not sufficient for this.

Figure 10:
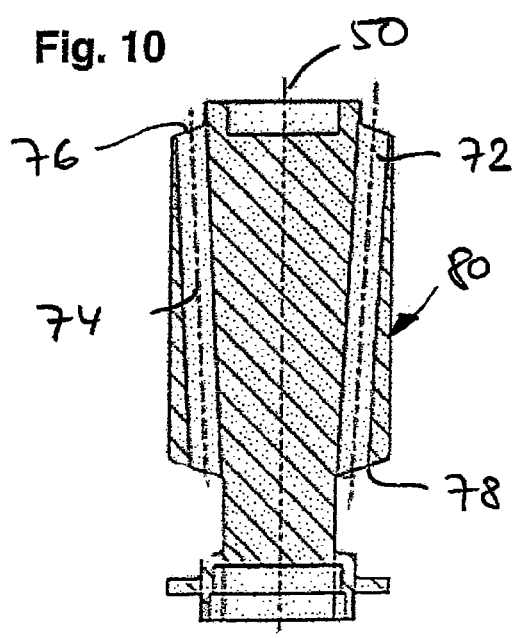
FIG. 10: shows a longitudinal section through an armature unit according to yet another embodiment of the invention.

In yet another example of embodiment of the invention, the sectional view of FIG. 10 shows how even a small angle of inclination of the through-channel (here: of the pair of through-bores 72, 74) with respect to the longitudinal axis achieves the advantages according to the invention. A different width of cone-shaped circumferential section 76 or cone wall region 78 of the cylindrical section 80 allows the oblique position relative to the longitudinal axis 50.

The present invention is not restricted to the illustrated examples of embodiments. For example it is also possible in particular to provide other geometrical shapes, configurations of the fluid flow channel (this need not necessarily be a bore) or opening geometries thereof. Although the present invention is particularly advantageous for producing hydraulic or pneumatic valves in the vehicle sector, the use according to the invention is also not restricted to this.

The invention claimed is:

1. An electromagnetic actuating device comprising an armature unit which can be moved along a longitudinal axis relative to a stationary core by passing a current through a coil device, said armature unit being designed to form or define a fluid flow channel, wherein the armature unit has at one end an axially elongate cylindrical section made from a metal material, to which an annular groove-shaped section of reduced outer diameter is connected in the direction of the longitudinal axis, the one end has a cone-shaped annular surface which forms a wall region of the annular groove-shaped section, wherein the fluid flow channel extends into the annular groove-shaped section, wherein the fluid flow channel comprises a through-bore which runs through the elongate cylindrical section obliquely with respect to the longitudinal axis and through the longitudinal axis, so that a first opening is formed in the cone-shaped annular surface at the one end and an opposite second opening of the through-bore are provided outside the cylindrical outer wall on another end of the elongate section, wherein the second opening of the through-bore is formed on a cone-shaped annular surface on the other end of the armature unit.

2. The device according to claim 1, wherein the cone-shaped surface is inclined at an angle between 50° and 80°, with respect to the longitudinal axis.

3. The device according to claim 1, wherein the cone-shaped surface is inclined at an angle between 60° and 70°, with respect to the longitudinal axis.

4. The device according to claim 1, wherein a radial width of the cone-shaped surface corresponds to an opening width of the first opening.

5. The device according to claim 1, wherein the wall region has a radial width which corresponds to the opening width of the second opening of the through-channel.

6. The device according to claim 1, wherein the fluid flow channel comprises a plurality of through-channels, wherein respective longitudinal axes of the through-channels, designed as respective through-bores, are in each case inclined with respect to the longitudinal axis and skewed with respect to one another.

7. The device according to claim 1, wherein the other end includes a flat recessed portion which receives a seal.

* * * * *